Inventor,
James Thomas,
By Samuel W. Balch
Attorney.

Jan. 20, 1931.  J. THOMAS  1,789,537
METHOD OF AND MACHINE FOR THREADING CARRIERS
Filed April 17, 1929  15 Sheets-Sheet 5

Inventor,
James Thomas,
By Samuel W. Balch
Attorney.

Jan. 20, 1931. J. THOMAS 1,789,537
METHOD OF AND MACHINE FOR THREADING CARRIERS
Filed April 17, 1929 15 Sheets-Sheet 11

Inventor,
James Thomas,
By Samuel W. Balch
Attorney.

Jan. 20, 1931.  J. THOMAS  1,789,537
METHOD OF AND MACHINE FOR THREADING CARRIERS
Filed April 17, 1929  15 Sheets-Sheet 12

Inventor,
James Thomas,
By Samuel W. Balch
Attorney.

Inventor,
James Thomas,
By Samuel W. Balch
Attorney.

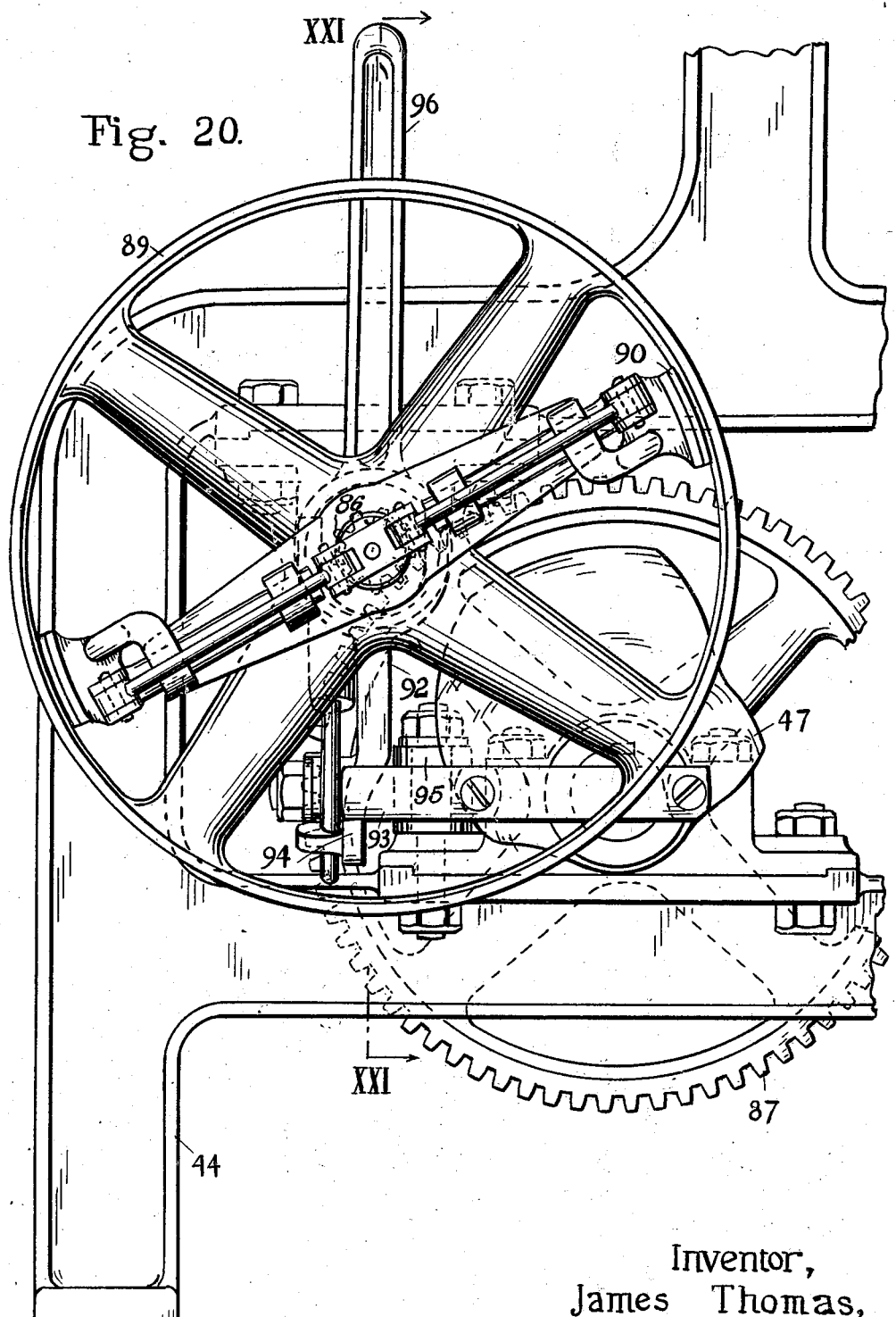

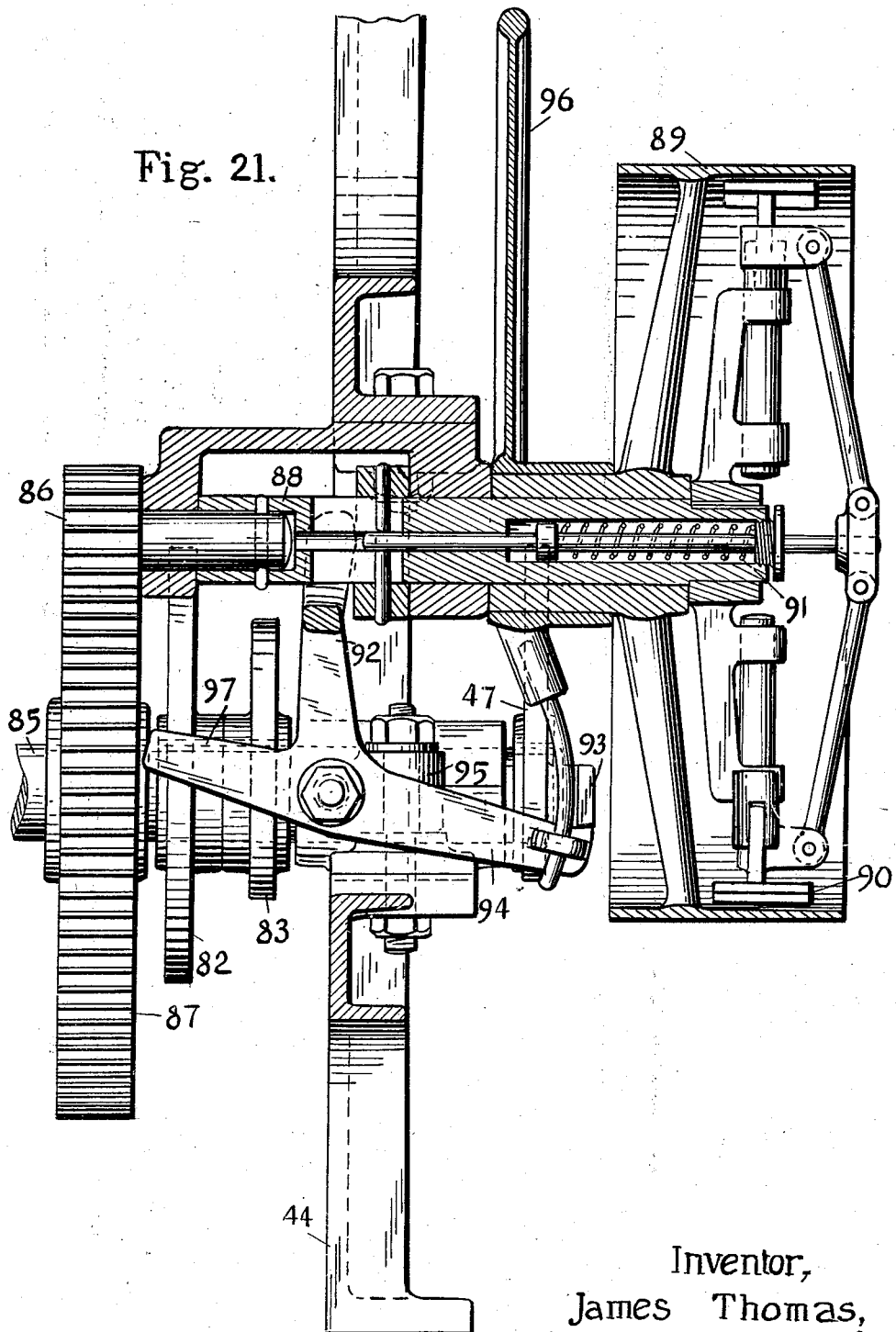

Patented Jan. 20, 1931

1,789,537

UNITED STATES PATENT OFFICE

JAMES THOMAS, OF YONKERS, NEW YORK, ASSIGNOR TO ALEXANDER SMITH & SONS CARPET COMPANY, OF YONKERS, NEW YORK, A CORPORATION OF NEW YORK

METHOD OF AND MACHINE FOR THREADING CARRIERS

Application filed April 17, 1929. Serial No. 355,796.

The object of this invention, more particularly, is to provide a method of and machine for more expeditiously threading the ends of tuft yarns through the tubes of tube-frames for use in Axminster looms. The method consists particularly in closing a guide tube around each yarn with the free end within the guide tube, connecting the end of the guide tube and the opening in the carrier, and causing a current of air to pass through the guide tube and carrier. Conveniently, the current is caused by suction, by connecting a vacuum chamber with the opposite end of the opening in the carrier. But this invention is not restricted to this specific use but may be utilized for the insertion of the end of a thread or yarn through the opening in any type of carrier for thread or which is provided with an opening through which the thread is to be passed.

Further objects are to provide a method and machine with which the size of the thread or yarn relative to the size of the opening through which it is to be passed may be materially greater than is permissible with other types of threading apparatus, and the thread if desired may be of such size as to substantially fill the opening.

In the accompanying fifteen sheets of drawings which form a part of this description, Figure 1 is an end view from the right-hand end of the upper part of a machine which embodies this invention, the parts being shown in the open and initial position of the machine.

Fig. 2 is a transverse section on the line II—II of Fig. 10 with the parts in the initial position.

Figs. 3, 4, 5, and 6 are similar sections of a portion of the machine, including a tube-frame, and showing successive positions in the operation of threading.

Fig. 20 is an elevation of the lower portion of the left-hand end of the machine showing the driving pulley.

Fig. 21 is a vertical section through the driving pulley and countershaft on the line XXI—XXI of Fig. 20, showing the starting and stopping mechanism.

Figure 1:
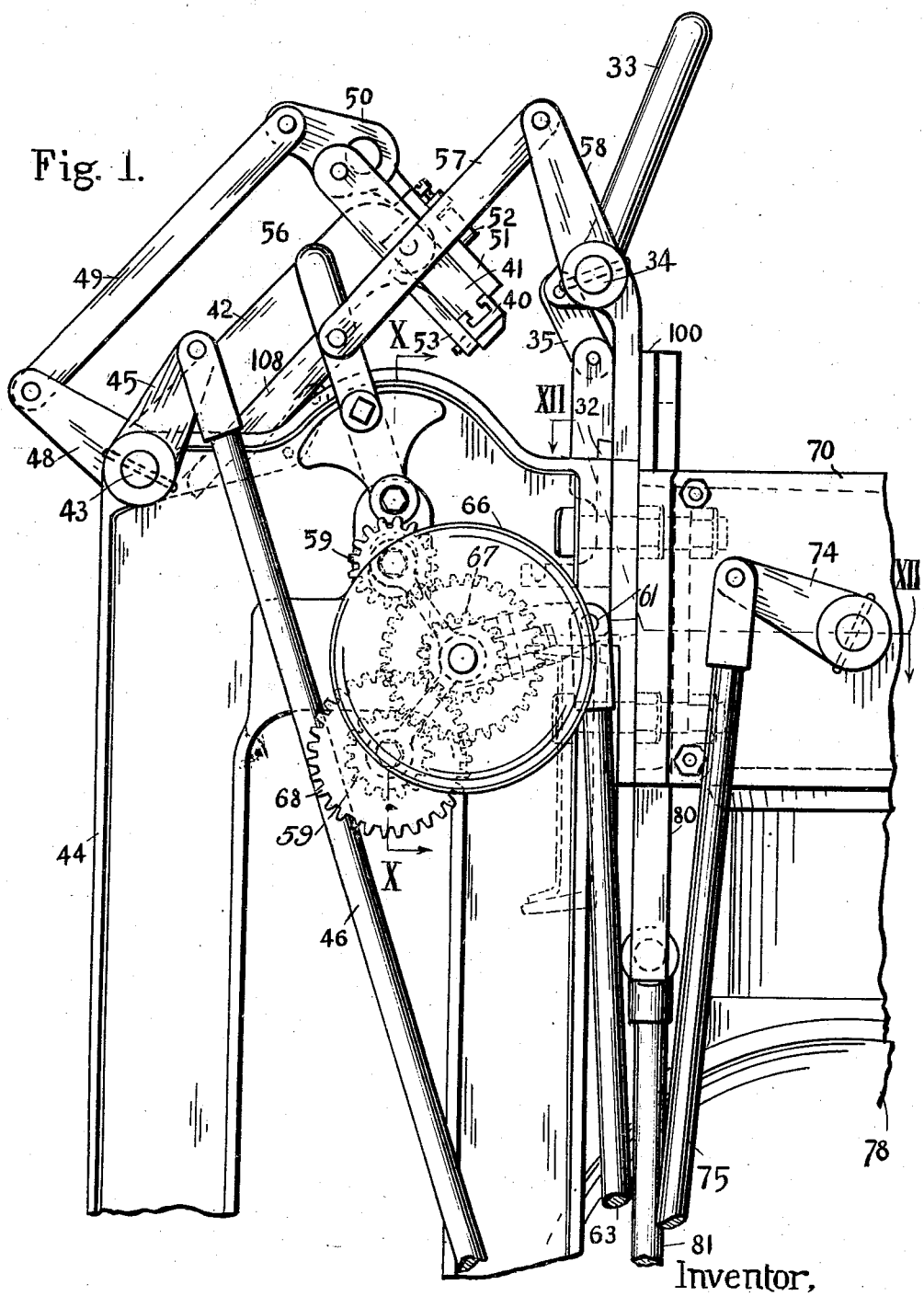
Figure 2:
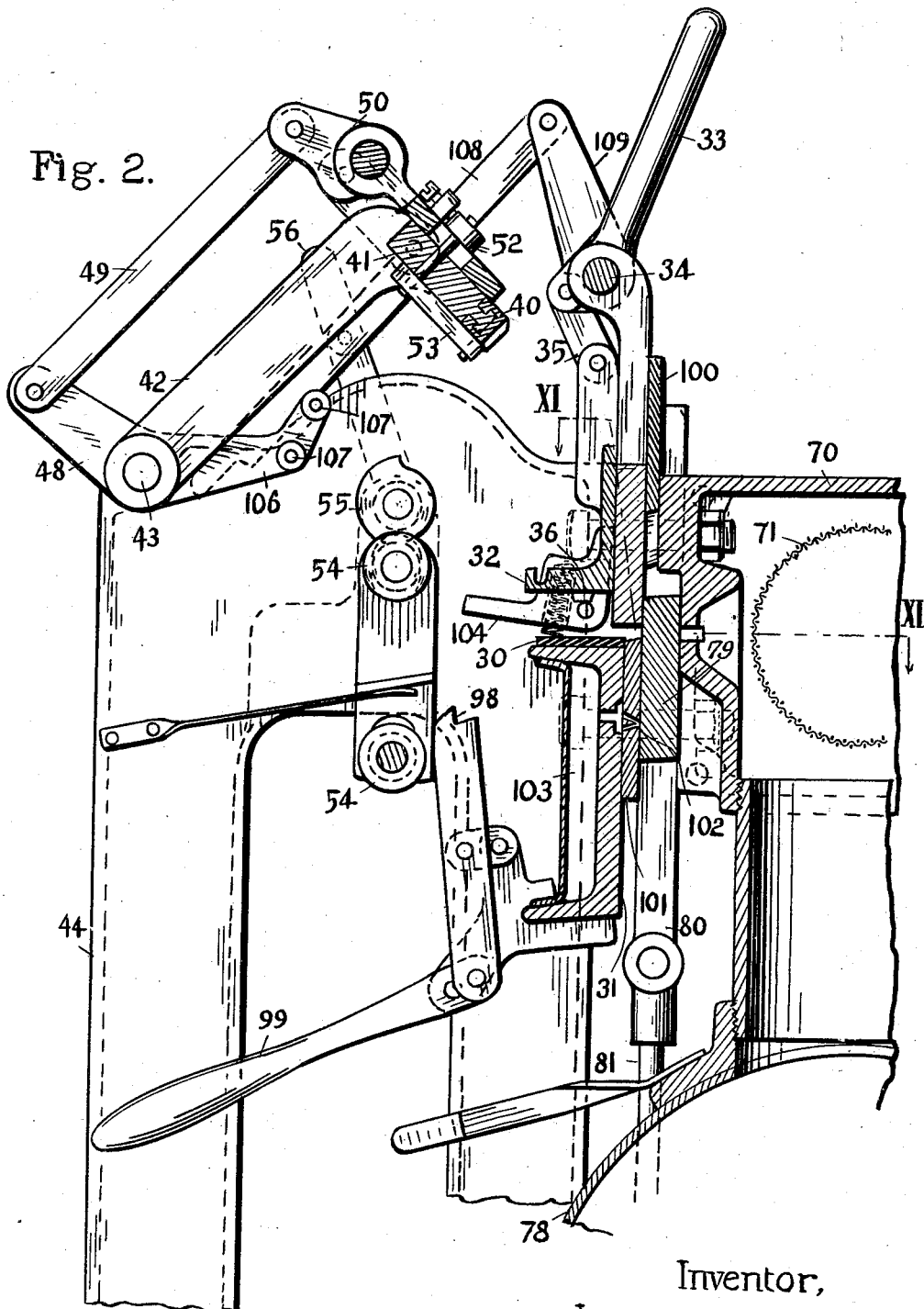
Figure 3:
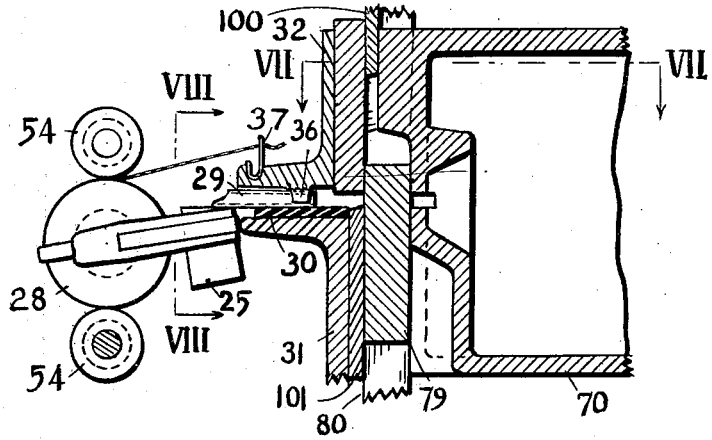
Figure 4:
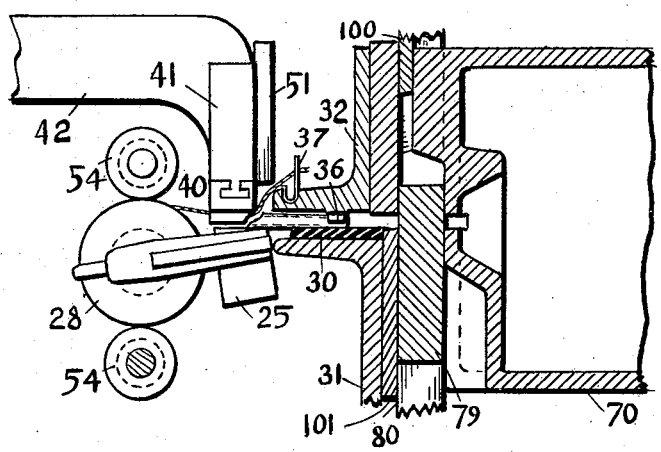
Figure 5:
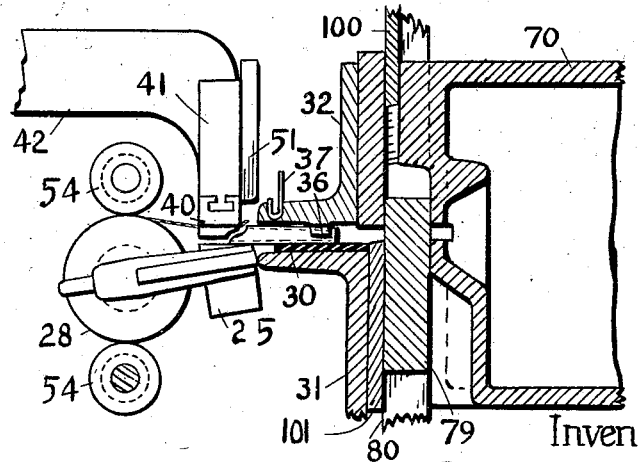
Figure 6:
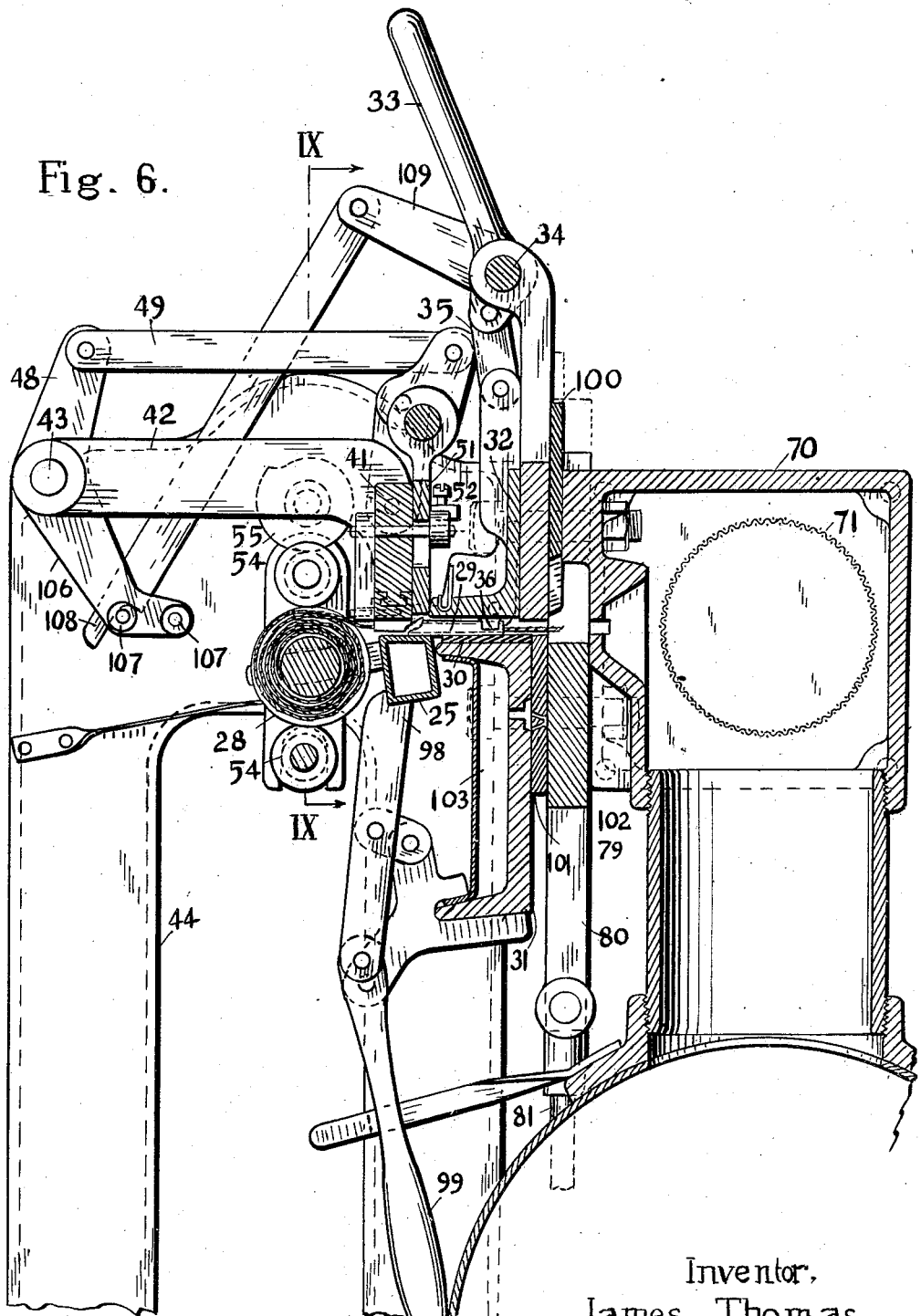
Figure 7:
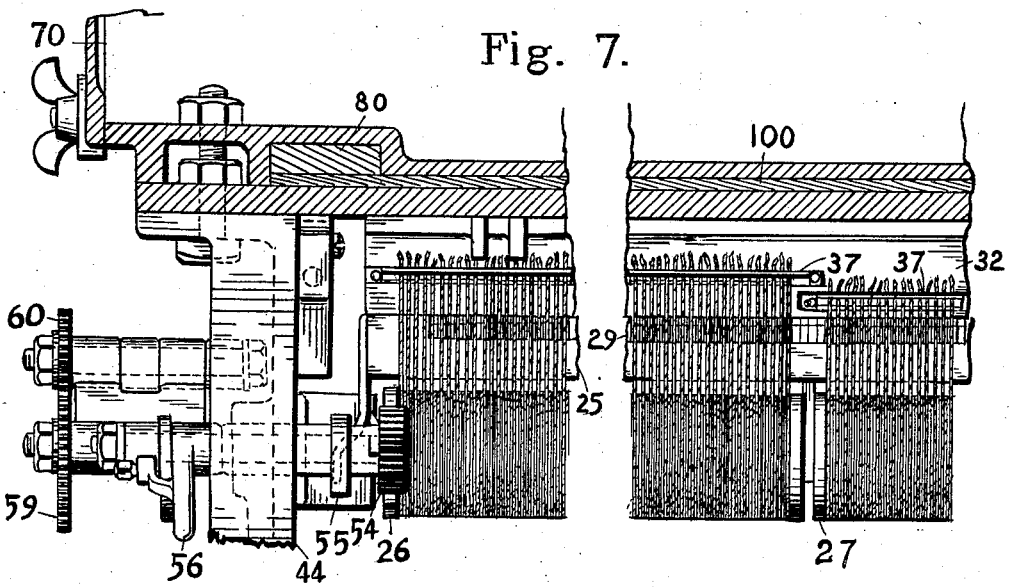
Fig. 7 is a horizontal section on the line VII—VII of Fig. 3 at the left-hand end of the machine.
Figure 8:
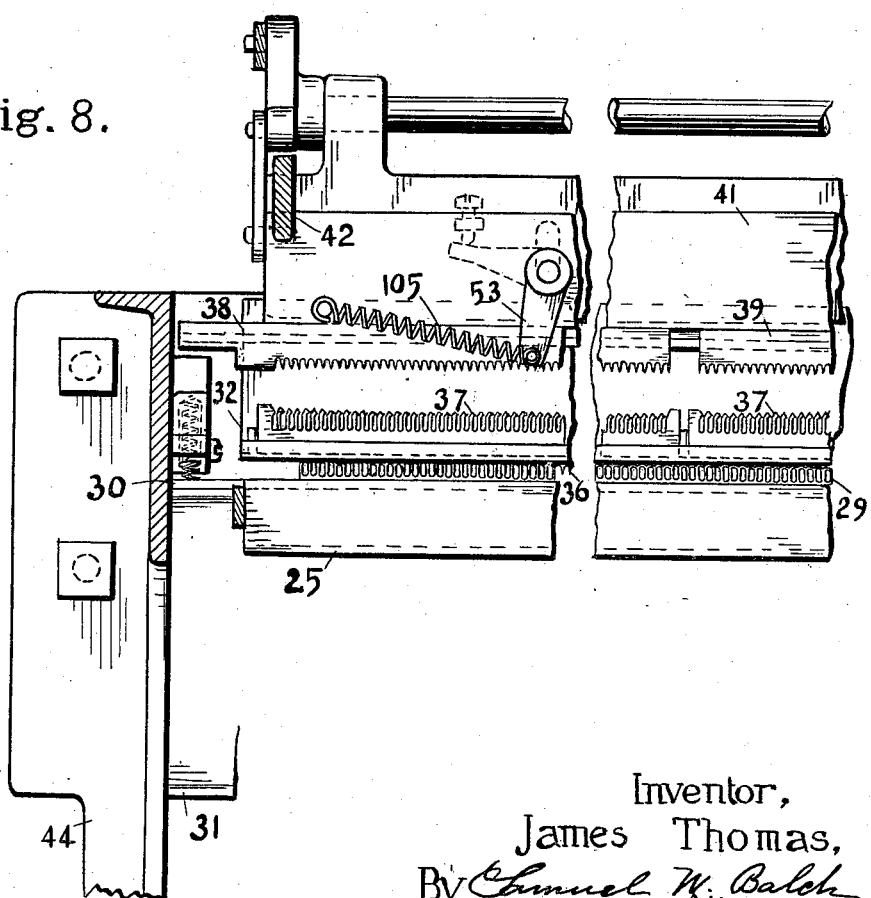
Fig. 8 is a vertical section on the line VIII—VIII of Fig. 3 with the serrated bar which forms guide tubes around the yarns partially lowered and its sections spaced.
Figure 9:
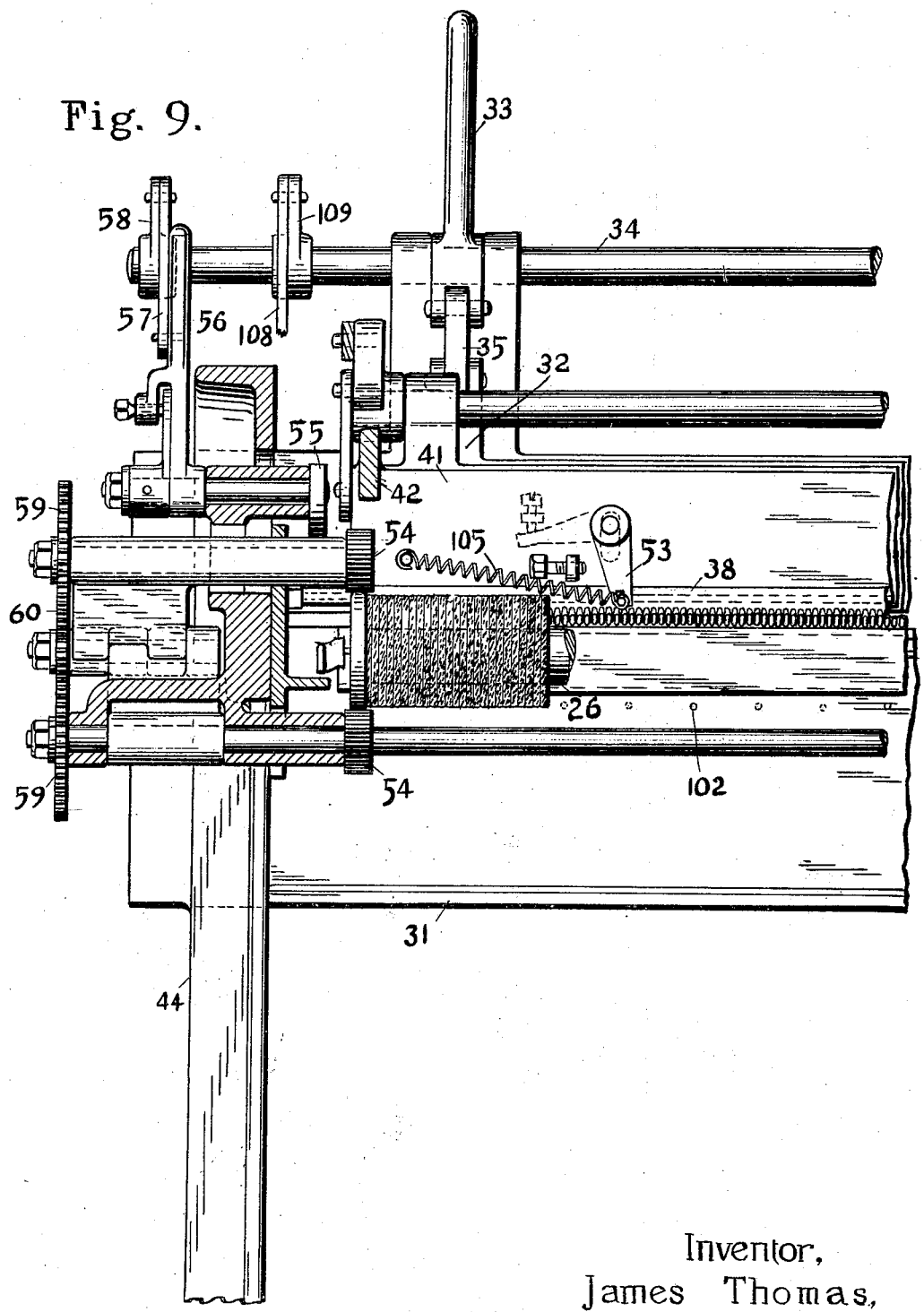
Figs. 9 and 10 are vertical sections respectively on the line IX—IX of Fig. 6 and on the line X—X of Fig. 1, at the left-hand and at the right-hand ends of the machine, with the bar lowered which closes the gap beween the guide tubes and the tubes of the tube frame, and showing the sections of the serrated bar brought together.
Figure 10:
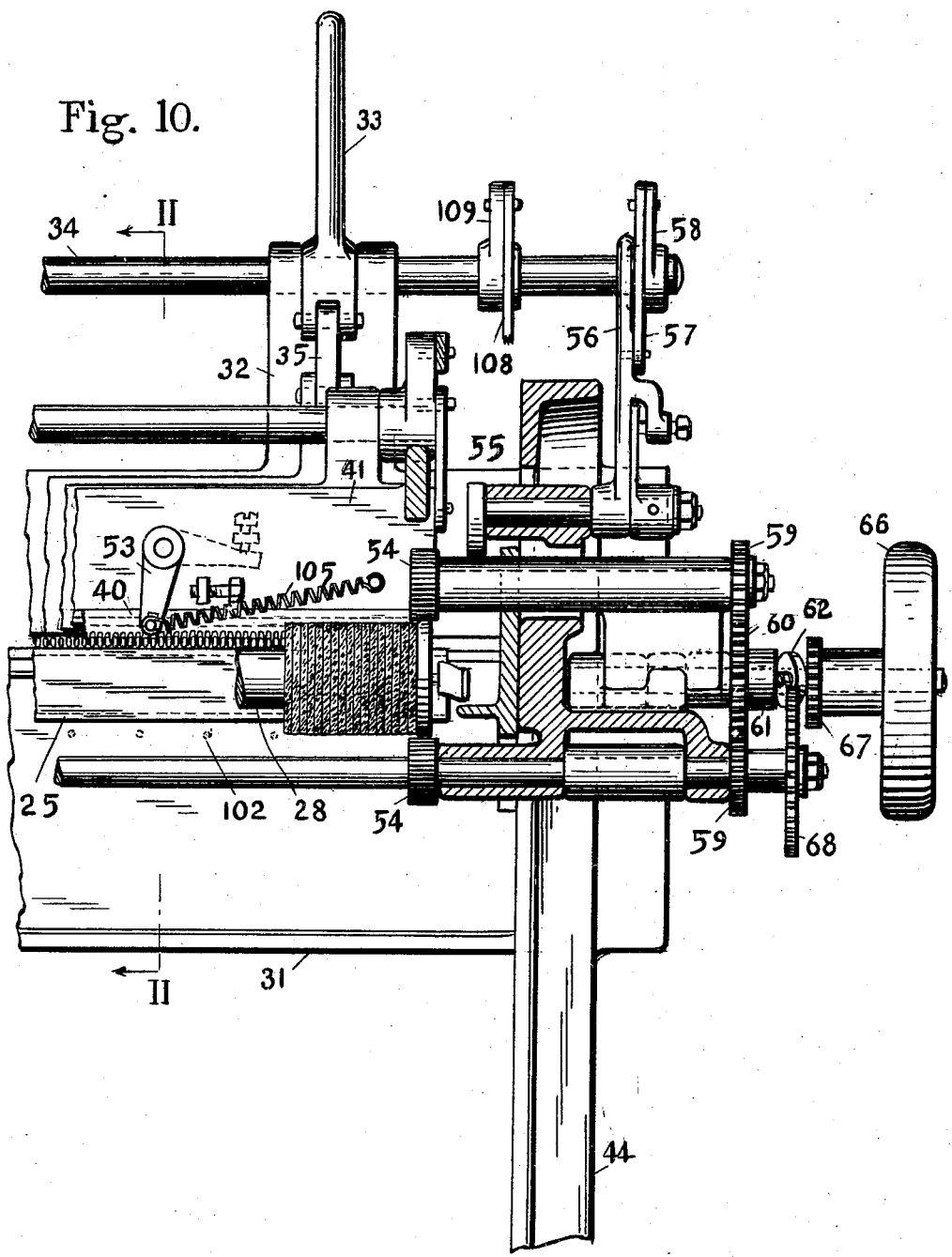
Figure 11:
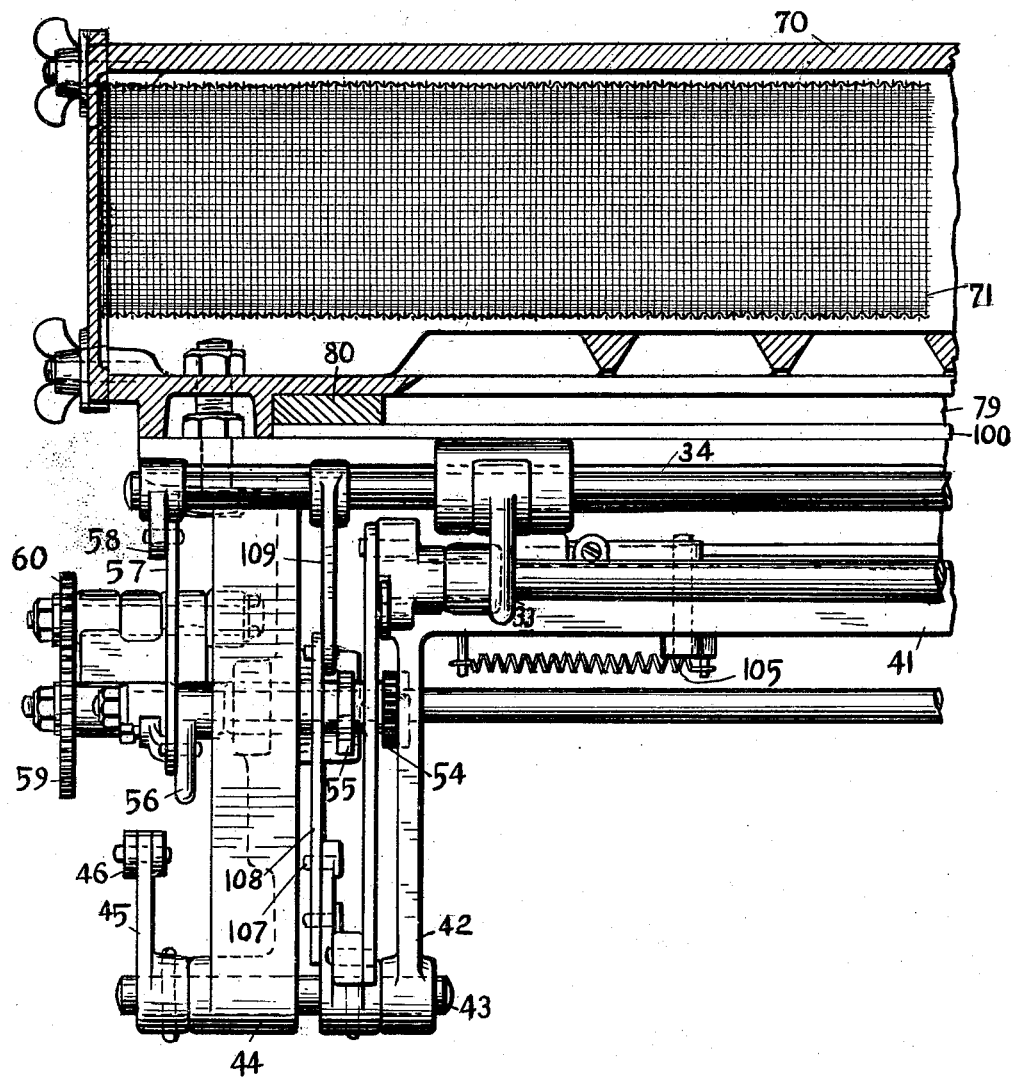
Figs. 11 and 12 are plan views respectively of the left-hand and of the right-hand ends of the machine with the vacuum chamber in section on the lines XI—XI of Fig. 2 and XII—XII of Fig. 1.
Figure 12:
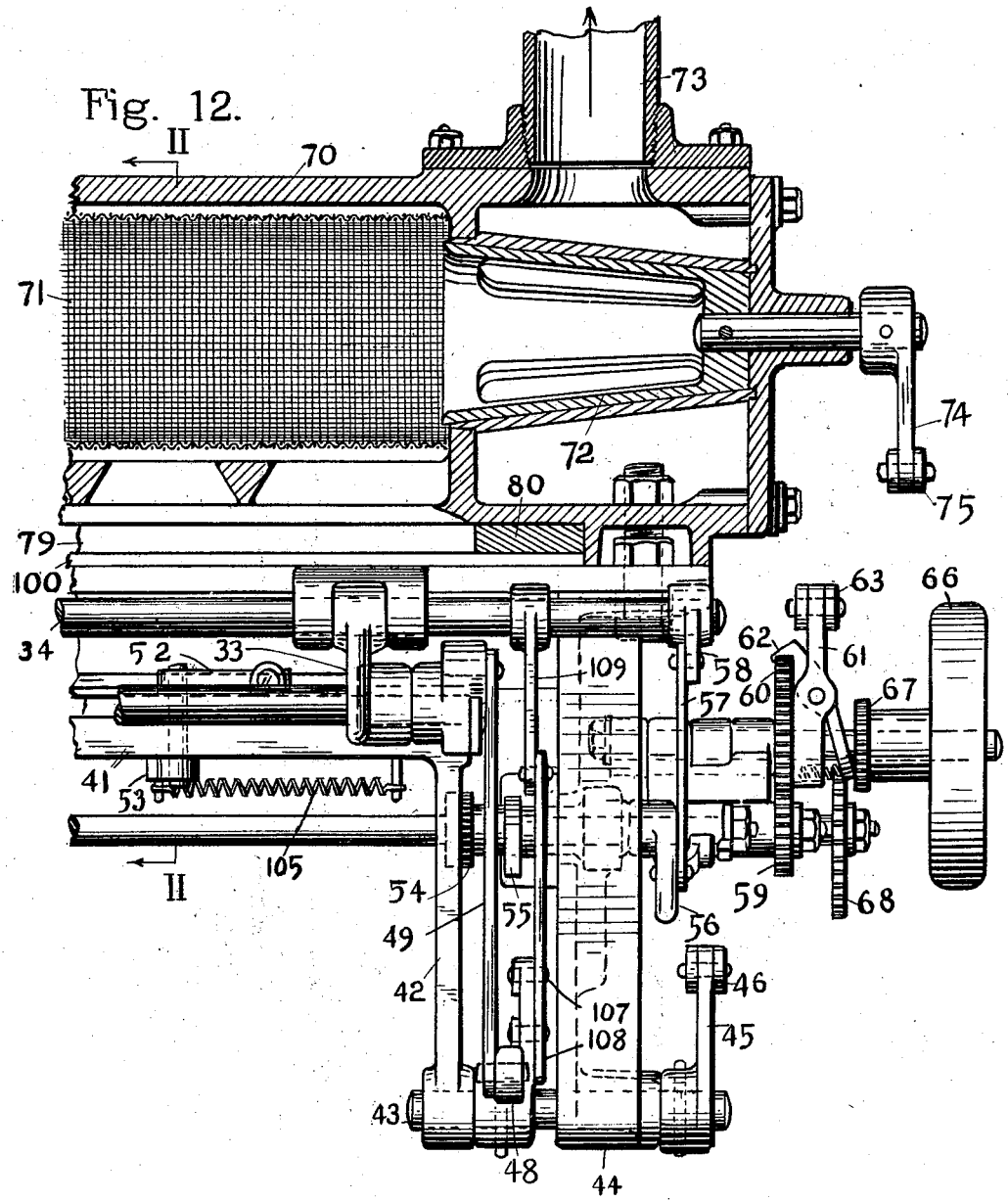
Figure 13:
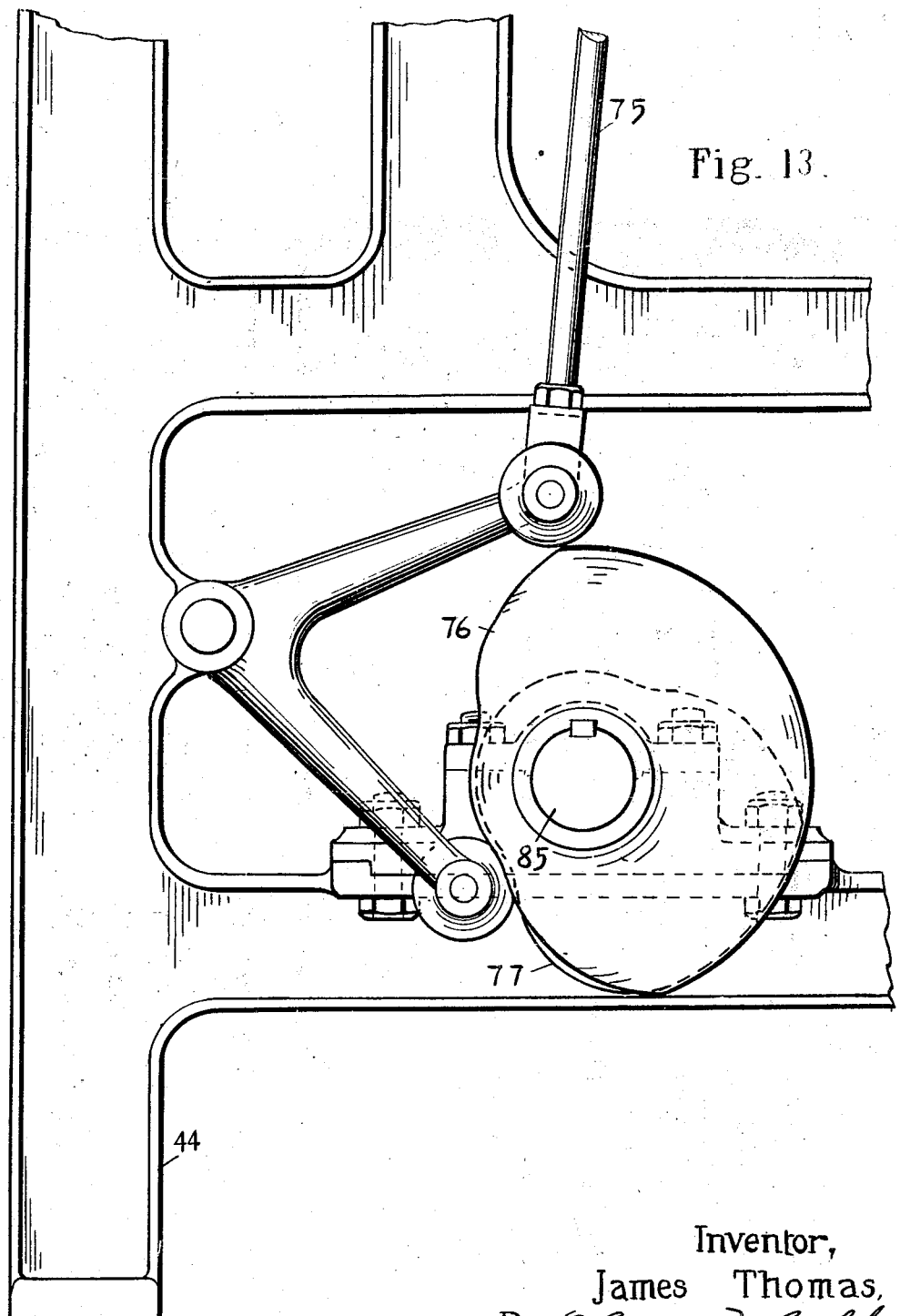
Fig. 13 is an end view from the right-hand end of the lower part of the machine showing the cams which control the valve through which air is exhausted from the vacuum chamber.
Figure 14:
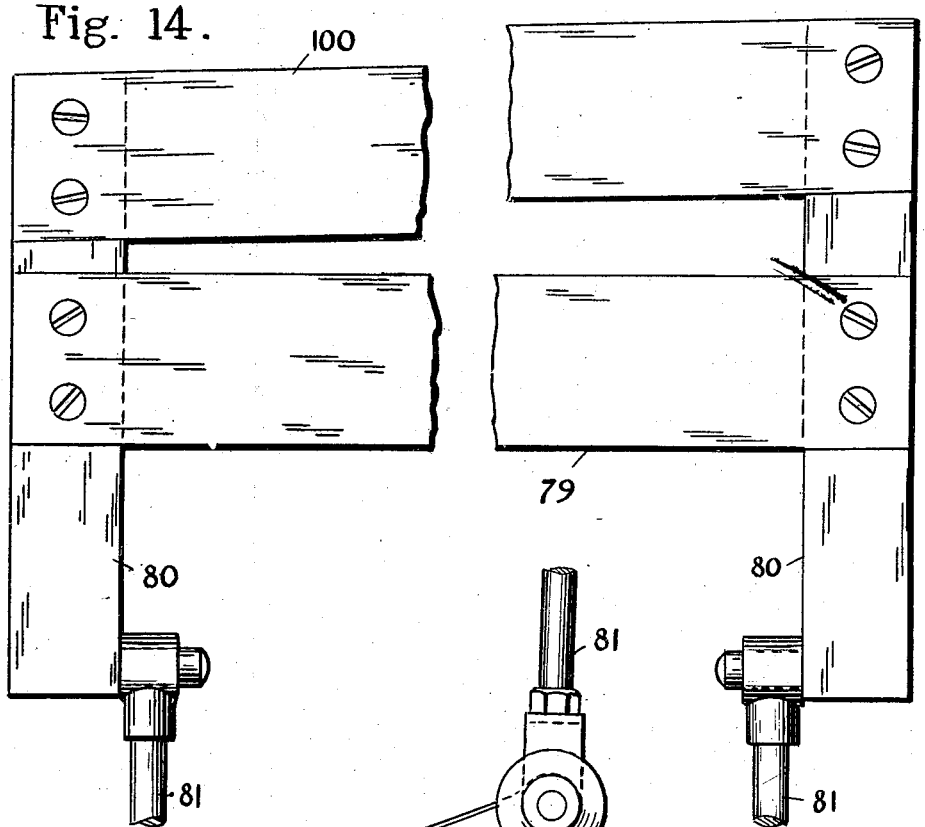
Fig. 14 is an elevation of the valve bar which controls the air connection between the vacuum chamber and the tubes of the tube frame, and also an elevation of the movable knife for trimming the threaded ends, the middle portions being broken out.
Figure 15:
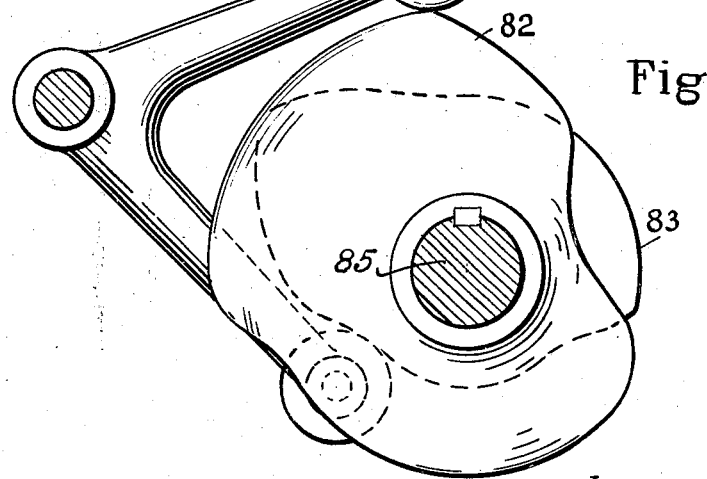
Fig. 15 is an elevation of the cams for operating the valve bar and the knife.
Figure 16:
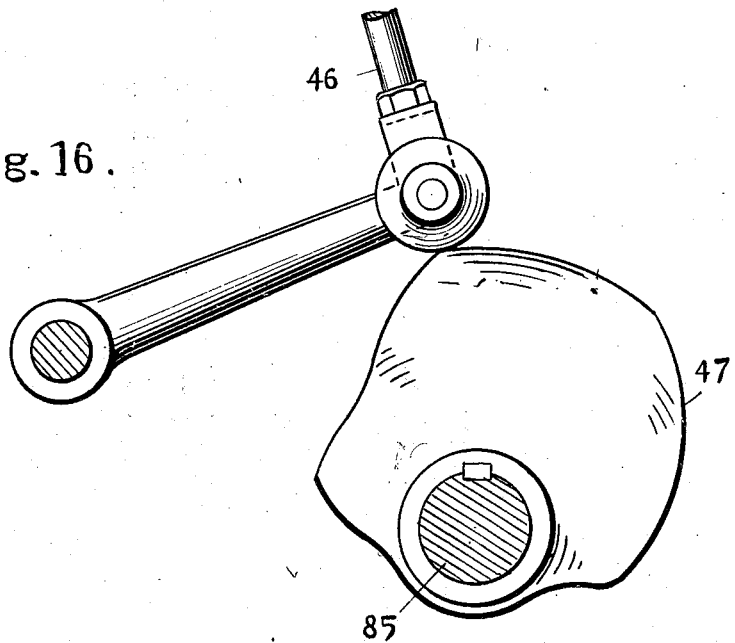
Fig. 16 is an elevation of the cam for lifting and lowering the sections of the serrated bar.
Figure 17:
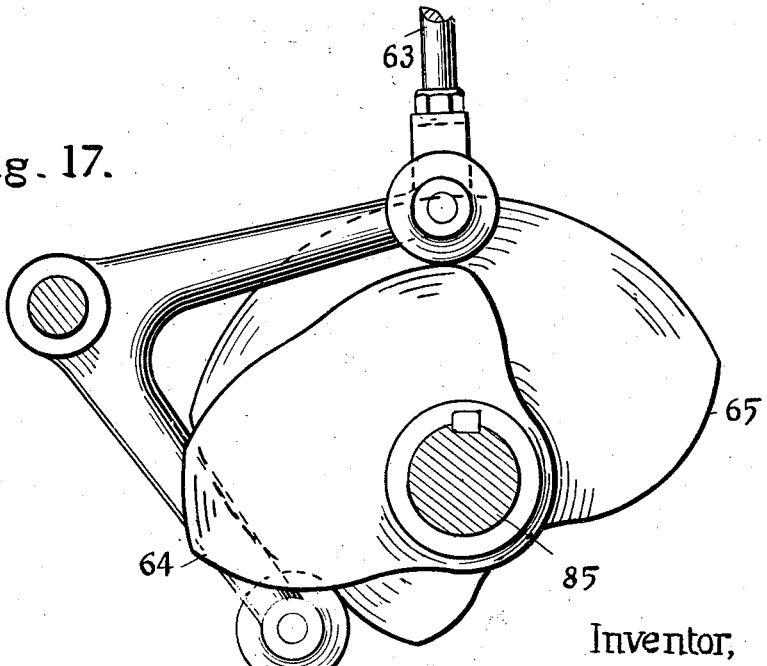
Fig. 17 is an elevation of the cams for turning the spools.
Figure 18:
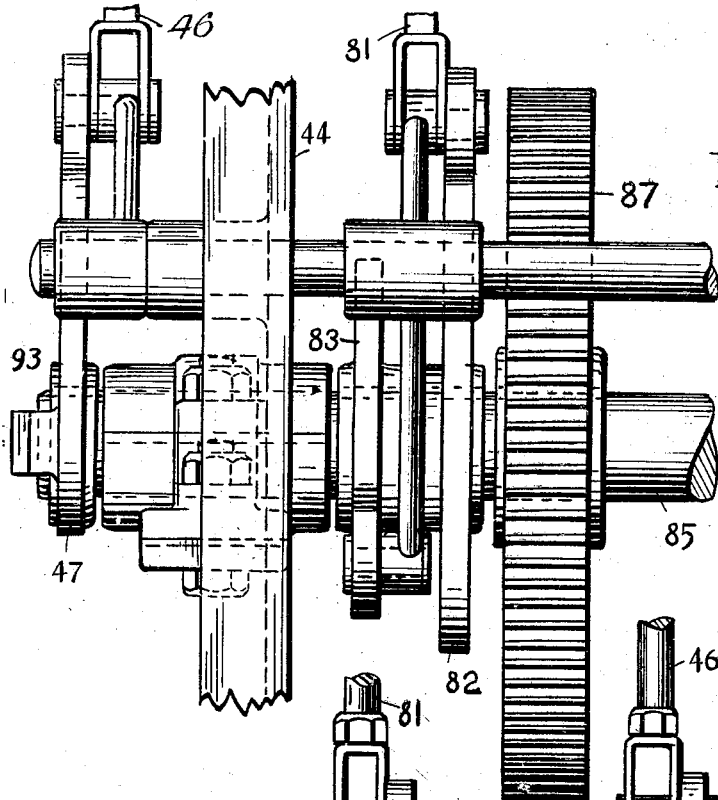
Figs. 18 and 19 are elevations respectively of the left-hand end and of the right-hand end of the cam shaft and bell-cranks which carry the cam rollers.
Figure 19:
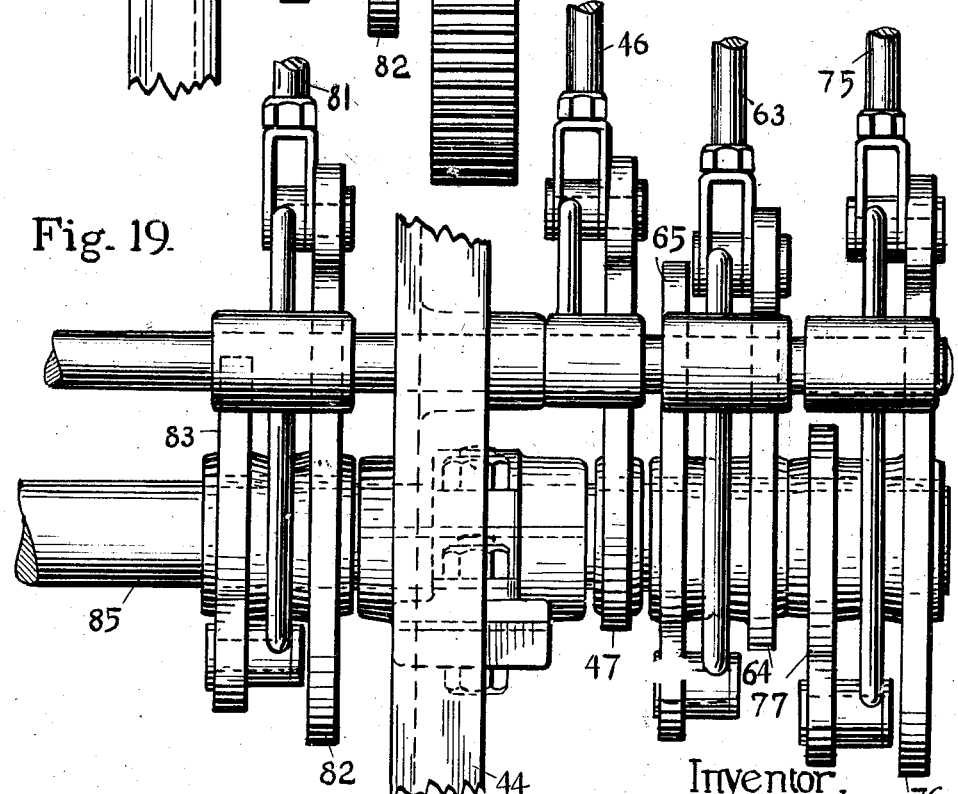

The machine as illustrated is designed to receive a tube-frame 25 which carries three spools 26, 27, 28 and tubes 29, 29, constituting yarn carriers, the entire series of tubes being in a uniformly spaced line. Each spool carries a series of yarns, the ends of which are spaced the same as the tubes, but owing to the flanges of the spools and the presence of supports from the tube-frame between the spools, the adjoining yarns from adjoining spools will lead off from the spools more widely spaced than the tubes.

The projecting ends of the tubes rest on a rubber cushion 30 which covers the upper flange of a channel beam 31 which is a part of the framework of the machine. A clamping bracket 32 overlies the ends of the tubes and is pressed down on them by drawing forward either of the hand levers 33, 33 on a rock shaft 34. Connection to the bracket is through links 35, 35. The underside of the bracket carries serrations 36, 36 which enter between the tubes of the tube-frame in order that a tight joint may be effected and passage of air outside the tubes prevented.

On the upper side of the bracket are channels for positioning and supporting temporary holders 37, 37 for the yarn ends. These holders are applied at the time of spooling, each engaging all of the yarn ends on a spool, and they are brought to the machine with the spools and tube-frame. When set in place on the bracket a uniformly spaced group of parallel yarns is drawn between each spool and the temporary holder for the yarn ends and the adjacent yarns of adjacent spools are more widely spaced. Three bars 38, 39, 40 are carried above the yarns drawn between the spools and the temporary holders. Each bar has serrations on its underside to receive when lowered the yarns of one of the spools when the yarns are drawn between the spool and its temporary holder and the serrations rest against the top of the main cross bar of the tube-frame and thereby form a series of guide tubes for the yarns. These bars are carried by a beam 41 which has arms 42, 42 at its ends carried on shafts 43, 43 journalled in the end frames 44, 44 of the machine, so as to permit of the raising and lowering of the beam with the serrated bars.

The bars at either end can be slid longitudinally along the beam and can be spaced from the middle bar to positions where their serrations can engage the yarns of the end spools, or the ends of the bars can be brought together to form a uniformly spaced series of guide tubes opposite the tubes of the tube-frame. The beam is lifted through arms 45, 45 through connecting rods 46, 46 and cams 47, 47, and is supported through these parts in its raised position. The connection is not directly from the shafts to the beam arms, but through arms 48, 48, links 49, 49 and bell-cranks 50, 50 to a gate plate 51 which has a limited vertical movement on the face of the beam and when lowered serves to bridge a space between the guide tubes and the tubes of the tube-frame and thereby connect them.

As this gate plate is lowered relative to the beam which carries it, the end bars of the three bars forming the guide tubes are moved longitudinally so that their ends abut the ends of the middle bar. This is effected through bell-cranks each with arms 52, 53 on opposite sides of the beam.

The flanges at the outer ends of the end spools are engaged by rubber faced friction wheels 54, 54 which are pressed toward each other by cams 55, 55. The cams are turned by handles 56, 56 which may be connected through links 57, 57 and arms 58, 58 with the rock shaft through which the tubes of the tube-frame are clamped so that all may be clamped through one handle. The spools are coupled together so that the middle spool turns with the end spools. The spools through these friction wheels have both hand and power adjustment. The shafts which carry these friction wheels have gears 59, 59 connected through an intermediate gear 60. A lever 61 carries a latch 62 which connects the lever and gear. The lever is operated through a connecting rod 63 from cams 64, 65. For hand operation, a hand-wheel 66 is loosely carried on a shaft. Attached to its hub is a gear 67 for the operation of the friction wheels when shifted axially to bring the gears into mesh. Such shifting also unlatches the power connection. The connection is to a larger gear 68, thereby affording mechanical advantage and rendering it easier to make the proper adjustment.

Air is exhausted from a vacuum chamber 70 through a screen 71, valve 72 and pipe 73. The valve is controlled through an arm 74, connecting rod 75 and cams 76, 77. To provide additional capacity to the vacuum chamber, a drum 78 is coupled thereto. The vacuum chamber has a slot opposite the line of tubes of the tube-frame which is closed by a bar 79 which is a slot valve carried by vertically guided bars 80, 80 which are operated through connecting rods 81, 81 from cams 82, 83.

A shaft 85 carries the cams. It is driven through gears 86, 87 from a jack shaft 88. The jack shaft carries a loose pulley 89 which connects with the shaft through a clutch 90. The clutch is applied by a spring 91 and is released by the pressure of a forked arm 92 of a bell-crank lever which is operated from a shaft arm 93 carried by the cam shaft which bears on the other arm 94 of the bell-crank lever when the shaft has made a revolution and reaches its initial position. This lever rocks about a horizontal axis and is mounted on a block 95 which can be turned about a vertical axis so that the arm 94 of the bell-crank lever can be moved out past the end of the shaft arm. A starting lever 96 effects this movement.

To insure return of the bell-crank lever arm into the path of the shaft arm so that the cam shaft will be stopped when it has made a revolution, an arm 97 is provided on the bell-crank lever, and is engaged by the high point of one of the cams and turns back the block 94 about its vertical axis and returns the bell-crank lever to its operative position.

In operating the machine, and while it is at rest and the beam 41 is upraised, the tube-frame with its spools filled with yarn is set in place. The tube-frame usually has a slight camber and to make it straight it is engaged by a latch 98 operated through a hand lever 99. The tube ends are set in a slot between the rubber cushion 30, which is under them, and the clamping bracket 32 which overlies them and is serrated so as to conform to the tubes and so seal them in the slot that air cannot pass except through the tubes. This clamping is effected by hand through the rock-shaft 34. The friction wheels 54, 54 are clamped on the flanges at the outer ends of the end spools. Connections for this clamping are made to the rock-shaft so that the clamping at both ends of the line of spools and of the tubes can be effected through one handle. The spools may now be turned through the hand-wheel 66 and are turned to slacken the yarns on the spools so that the temporary holders 37, 37 may be set over to their positions on the bracket 32, and these are then set in place.

Next, by turning the hand-wheel the slack yarns are taken up so that the yarns are drawn straight between the spools and the temporary holders and any excess lengths of yarn ends beyond the holders are withdrawn. The ends are also trimmed if the ends beyond the holders are irregular.

The machine is next started and through its cams the succeeding operations are brought about. The rotary valve 72 is at once opened and the air in the vacuum chamber 70 and drum 78 is drawn off through the pipe 73 by a vacuum pump not shown. At the same time the beam 41 is lowered, with the serrated bars 38, 39, 40, the serrations of which engage the sections of the yarns between the spools and the temporary holders. The tips of the serrations substantially close against the main cross-bar of the tube-frame 25 and thereby the notch between each two adjoining serrations is converted into a guide tube surrounding a yarn. Also each notch of the middle bar is brought opposite the end of the tube of the tube frame and the guide tubes and the tubes of the tube-frame are thereby connected. As the guide tubes are first closed around the yarns the connections between them and the tubes of the tube frame are not made air tight and sufficient space is left between the ends of the guide tubes and the tubes of the tube frame so as not to clamp the yarns between them.

The spools are next turned about a quarter of a revolution to withdraw the yarn ends from the temporary holders and to bring the yarn ends within the guide tubes. The gate plate 51 next descends and closes the space between the serrated bars 38, 39, 40 and the bracket 32. This is to cut off leakage in the space left between the ends of the guide tubes and the tubes of the tube-frame so that all air which passes through the tubes of the tube-frame will also have to be drawn through the guide tubes. However, if there is sufficient air-pressure difference to cause a strong air flow and the leakage is kept small, the gate plate can be omitted and the connections between the guide tubes and the tubes of the tube-frame will be sufficiently complete without it. While the gate plate is descending, the end serrated bars are shifted endwise to bring the guide tubes formed by their serrations opposite the ends of the proper tubes of the tube-frame.

The spools are next turned about a half revolution in the opposite direction from the previous turning to unwind or slacken the yarn ends and at the same time the slot valve is opened and air flows into the vacuum chamber through the guide tubes and the tubes of the tube-frame and draws with it the slackened yarn ends and threads them through the tubes. During this operation the rotary valve is closed and the vacuum chamber fills to atmospheric pressure.

Further downward movement of the bars which carry the slot-valve next take place and a movable knife 100 cooperating with a fixed knife 101 trims the threaded ends at a uniform distance from the ends of the tubes. As the trimmed off ends will fall on the slot-valve bar, means are provided for their removal. This means consists in a series of nozzles 102, 102 through which air from a pressure chamber 103 is directed across the top of the bar.

The parts are next returned to their initial position, the gate plate first lifting and next the beam which carries the serrated bars, but the end serrated bars are not permitted to shift back endwise by reason of latches 104, 104 until they have been lifted clear of the yarns when they are also lifted clear of the latches. The end bars are then spaced from the middle bar by springs 105, 105.

On the shafts through which the gate plate and beam are lifted are arms 106, 106 with pins 107, 107 which engage rods 108, 108 and through arms 109, 109 unclamp the spools from engagement by the friction wheels. The parts which operate these wheels can now be returned to their initial position without disturbing the spools and unthreading the tubes.

The machine is stopped by the shaft-bar 93 coming in contact with the bell-crank arm 94 and the opening of the clutch by the other arm 92 of the bell-crank.

I claim:—

1. The method of threading a yarn end though an opening in a carrier, which consists in closing a guide tube around the yarn with the free end within the guide tube, connecting the end of the guide tube and the opening in the carrier, and causing a current of air to pass through the guide tube and carrier.

2. The method of threading the end of spooled yarn through an opening in a carrier, which consists in closing a guide tube around the yarn while drawn between a spool and a temporary holder and bringing the end portion of the yarn within the guide tube, connecting the end of the guide tube and the opening in the carrier, and causing a current of air to pass through the guide tube and carrier.

3. The method of threading the end of spooled yarn through an opening in a carrier, which consists in closing a guide tube around the yarn while drawn between a spool and a temporary holder, withdrawing the yarn from the temporary holder and bringing the end portion of the yarn within the guide tube, connecting the end of the guide tube and the opening in the carrier, and unwinding a portion of the yarn and concurrently causing a current of air to pass through the guide tube and carrier.

4. The method of threading a yarn end through an opening in a carrier, which consists in closing a guide tube around the yarn with the end portion of the yarn within the guide tube, connecting the end of the guide tube and one end of the opening in the carrier, and connecting a vacuum chamber with the opposite end of the opening in the carrier.

5. The method of threading the end of spooled yarn through an opening in a carrier, which consists in closing a guide tube around the yarn while drawn between a spool and a temporary holder, turning the spool to withdraw the yarn from the temporary holder and to bring the end portion of the yarn within the guide tube, connecting the end of the guide tube and one end of the opening in the carrier, and unwinding a portion of the yarn and concurrently connecting a vacuum chamber with the opposite end of the opening in the carrier.

6. The method of threading the ends of yarns carried on a spool in a tube-frame, which consists in supporting a temporary holder for the yarn ends adjacent to the tubes of the tube-frame, closing a bar with serrations to receive the yarns against the tube-frame and thereby forming a guide tube around each yarn while drawn between the spool and the temporary holder, turning the spool to withdraw the yarns from the temporary holder and to bring the end portions of the yarns within the guide tubes, connecting the ends of the guide tubes with the ends of the tubes of the tube-frame, and unwinding portions of the yarns and concurrently causing a current of air to pass through the guide tubes and the tubes of the tube-frame.

7. The method of threading the ends of yarns carried on a spool in a tube-frame, which consists in holding the tubes of the tube-frame opposite the mouth of a vacuum chamber, supporting a temporary holder for the yarn ends adjacent to the tubes of the tube-frame, closing a bar with serrations to receive the yarns against the tube-frame and thereby forming a guide tube around each yarn while drawn between the spool and the temporary holder, turning the spool to withdraw the yarns from the temporary holder and to bring the end portions of the yarns within the guide tubes, connecting the ends of the guide tubes with the ends of the tubes of the tube-frame, and unwinding portions of the yarns and concurrently connecting the vacuum chamber with the opposite ends of the tubes of the tube-frame.

8. The method of threading the ends of yarns carried on a series of spools in line and spaced apart in a tube-frame, the tube-frame having tubes in a uniformly spaced line, which consists in holding the tubes of the tube-frame opposite the mouth of a vacuum chamber, supporting adjacent to the tubes a temporary holder for the yarn ends of each spool whereby a uniformly spaced group of parallel yarns is drawn between the spool and its holder and the adjacent yarns of adjacent spools are more widely spaced, closing a series of spaced bars against the tube-frame, in which each bar has serrations to receive the yarns of a spool and to form guide tubes around each yarn while drawn between the spool and its temporary holder, turning the spools to withdraw the yarns from the temporary holders and to bring the end portions of the yarns within the guide tubes, bringing the ends of the bars together to form a uniformly spaced series of guide tubes opposite the tubes of the tube-frame, connecting the ends of the guide tubes with the ends of the tubes of the tube-frame, and unwinding a portion of the yarns and concurrently connecting the vacuum chamber with the opposite ends of the tubes of the tube-frame.

9. A machine for threading a yarn end through an opening in a carrier comprising a guide tube, means for locating the end portion of the yarn in the guide tube, means for connecting the end of the guide tube with the opening in the carrier, and means for causing a current of air to pass through the guide tube and carrier.

10. A machine for threading the end of spooled yarn through an opening in a carrier, comprising a guide tube with a side opening, means for closing the guide tube around the yarn while the yarn is held between a spool and a temporary holder, means for withdrawing the yarn from the temporary holder and bringing the end portion of the yarn within the guide tube, means for connecting the end of the guide tube and the opening in the carrier, and means for causing a current of air to pass through the guide tube and carrier.

11. A machine for threading the end of spooled yarn through an opening in a carrier, comprising a guide tube with a side opening, means for closing the guide tube around the yarn while drawn between a spool and a temporary holder, means for withdrawing the yarn from the temporary holder and bringing the end portion of the yarn within the guide tube, means for connecting the end of the guide tube and the opening in the carrier, and means for unwinding a portion of the yarn and concurrently causing a current of air to pass through the guide tube and carrier.

12. A machine for threading a yarn end through an opening in a carrier, comprising a guide tube, means for inserting the end portion of the yarn in the guide tube, means for connecting the end of the guide tube with one end of the opening in the carrier, a vacuum chamber, and means for connecting the vacuum chamber with the opposite end of the opening in the carrier.

13. A machine for threading the end of yarn through an opening in a carrier, comprising a guide tube with a side opening, means for closing the guide tube around the yarn while drawn between a spool and a temporary holder, means for turning the spool to withdraw the yarn from the temporary holder and to bring the end portion of the yarn within the guide tube, means for connecting the end of the guide tube and one end of the opening in the carrier, and means for unwinding a portion of the yarn and concurrently causing a current of air to pass through the guide tube and carrier.

14. A machine for threading the end of yarn through an opening in a carrier, comprising a guide tube with a side opening, means for closing the guide tube around the yarn while drawn between a spool and a temporary holder, means for turning the spool to withdraw the yarn from the temporary holder and to bring the end portion of the yarn within the guide tube, means for connecting the end of the guide tube and one end of the opening in the carrier, a vacuum chamber, and means for unwinding a portion of the yarn and concurrently connecting the vacuum chamber with the opening in the carrier.

15. A machine for threading the ends of yarns carried on a spool in a tube-frame through the tubes of the tube-frame, comprising a vacuum chamber, means for holding the tubes of the tube-frame opposite the mouth of the vacuum chamber, a support for a temporary holder for the yarn ends adjacent to the tubes of the tube frame, a bar with serrations to receive the yarns, means for closing the bar against the tube-frame to form a guide tube around each yarn while drawn between the spool and the temporary holder, means for turning the spool to withdraw the yarns from the temporary holder and bring the end portions of the yarns within the guide tubes, means for connecting the ends of the guide tubes with the ends of the tubes of the tube-frame, and means for unwinding portions of the yarns and concurrently connecting the vacuum chamber with the tubes of the tube-frame.

16. A machine for threading the ends of yarns carried on a series of spools in a tube-frame, the tube-frame having tubes in a uniformly spaced line, comprising a vacuum-chamber, means for holding the tubes of the tube-frame opposite the mouth of the vacuum chamber, a support adjacent to the tubes for a temporary holder for the yarn ends of each spool whereby a uniformly spaced group of parallel yarns is drawn between the spool and its holder and the adjoining yarns of adjacent spools are more widely spaced, a bar with serrations to receive the yarns of each spool, means for closing the bars against the tube-frame to form a guide tube around each yarn while drawn between its spool and its temporary holder, means for turning the spools to withdraw the yarns from the temporary holders and to bring the end portions of the yarns within the guide tubes, means for bringing the ends of the bars together to form a uniformly spaced series of guide tubes opposite the tubes of the tube frame, means for connecting the ends of the guide tubes with the ends of the tubes of the tube-frame, and means for unwinding portions of the yarns and concurrently connecting the vacuum chamber with the tubes of the tube-frame.

17. A machine for threading the ends of yarns carried on a series of spools in a tube-frame having tubes in a uniformly spaced line, comprising a support for a series of temporary holders for the yarn ends whereby a uniformly spaced group of parallel yarns is drawn between each of the spools and its holder and the adjoining yarns of adjacent spools are more widely spaced, a bar with serrations for engaging each group of yarns, means for spacing the bars corresponding to the groups of yarns, means for concurrently engaging the yarns by the bars, means for spacing the bars while in engagement with the yarns to correspond with the tubes of the tube-frame, and means for transferring the yarns from the bars to the tubes.

18. A machine for threading the ends of yarns carried on a spool which is supported in a tube-frame, comprising a support for the tube-frame, threading means, friction wheels for engaging the periphery of a flange of the spool, and means for concurrently operating the threading means and the friction wheels to slacken the yarns.

19. A machine for threading the ends of yarns carried on a spool that is supported in a tube-frame, comprising a support for the tube-frame, a support for a temporary holder, threading means, a bar with serrations for engaging the yarns between the spool and the temporary holder, friction wheels for engaging a flange of the spool, means for operating the friction wheels to turn the spool to withdraw the yarns from the temporary holder, and means for concurrently operating the threading means and the friction wheels to slacken the yarns.

JAMES THOMAS.